United States Patent

Maiwald

(10) Patent No.: US 10,396,626 B2
(45) Date of Patent: Aug. 27, 2019

(54) ELECTRIC MACHINE

(71) Applicant: AUDI AG, Ingolstadt (DE)

(72) Inventor: Stefan Maiwald, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 234 days.

(21) Appl. No.: 14/718,773

(22) Filed: May 21, 2015

(65) Prior Publication Data

US 2015/0340927 A1    Nov. 26, 2015

(30) Foreign Application Priority Data

May 22, 2014    (DE) .......................... 10 2014 007 550

(51) Int. Cl.
| | | |
|---|---|---|
| H02K 7/116 | (2006.01) | |
| F16H 1/36 | (2006.01) | |
| H02K 5/167 | (2006.01) | |
| H02K 5/173 | (2006.01) | |

(52) U.S. Cl.
CPC .............. H02K 7/116 (2013.01); F16H 1/36 (2013.01); H02K 5/1672 (2013.01); H02K 5/1732 (2013.01)

(58) Field of Classification Search
CPC ...... F16H 1/36; H02K 5/1672; H02K 5/1732; H02K 7/116; B60K 6/365
USPC ........................................................ 310/83
See application file for complete search history.

(56) References Cited

U.S. PATENT DOCUMENTS

| | | | | |
|---|---|---|---|---|
| 3,477,315 A * | 11/1969 | Macks | .................... | F16H 13/08 310/83 |
| 4,785,688 A * | 11/1988 | Shiozaki | .................. | B41J 11/24 310/103 |
| 4,987,788 A * | 1/1991 | Bausch | .................. | B60G 7/003 180/412 |
| 6,329,731 B1 * | 12/2001 | Arbanas | .............. | F16H 57/0416 310/52 |
| 7,717,203 B2 * | 5/2010 | Yoshino | ............... | B60K 7/0007 180/65.51 |
| 8,049,384 B2 * | 11/2011 | Wilton | ..................... | B60K 1/00 310/75 R |
| 8,888,650 B2 * | 11/2014 | Mori | ........................ | B60K 6/48 475/331 |
| 8,968,139 B2 * | 3/2015 | Fukami | .................... | B60K 1/00 475/150 |
| 2010/0320849 A1 | 12/2010 | Wilton et al. | | |

(Continued)

FOREIGN PATENT DOCUMENTS

| | | |
|---|---|---|
| CN | 101127467 | 2/2008 |
| CN | 102139738 | 8/2011 |

(Continued)

OTHER PUBLICATIONS

European Search Report dated Feb. 16, 2016 in corresponding European Search Report EP 15 00 1473.

(Continued)

*Primary Examiner* — Dirk Wright
(74) *Attorney, Agent, or Firm* — Henry M. Feiereisen

(57) ABSTRACT

An electric machine includes a housing, a shaft, which is rotatably supported in the housing, a stator, which is received in the housing, and a rotor, which is received in the housing and interacts with the stator. A planetary gear train, accommodated in the housing, connects the rotor and the shaft with one another.

3 Claims, 1 Drawing Sheet

(56) References Cited

U.S. PATENT DOCUMENTS

2012/0299416 A1* 11/2012 Chen ................ H02K 7/116
                                                310/83
2014/0141918 A1* 5/2014 Fukami ............... B60K 1/00
                                                475/150

FOREIGN PATENT DOCUMENTS

| DE | 10 2012 102 798 | 10/2013 | | |
|----|----|----|----|----|
| EP | 1 077 522 | 2/2001 | | |
| WO | WO 2012160887 A1 * | 11/2012 | ............... | B60K 1/00 |

OTHER PUBLICATIONS

Translation of European Search Report dated Feb. 16, 2016 in corresponding European Search Report EP 15 00 1473.

Chinese Search Report dated Feb. 27, 2017 with respect to counterpart Chinese patent application 201510259821.1.

Translation of Chinese Search Report dated Feb. 27, 2017 with respect to counterpart Chinese patent application 201510259821.1.

* cited by examiner

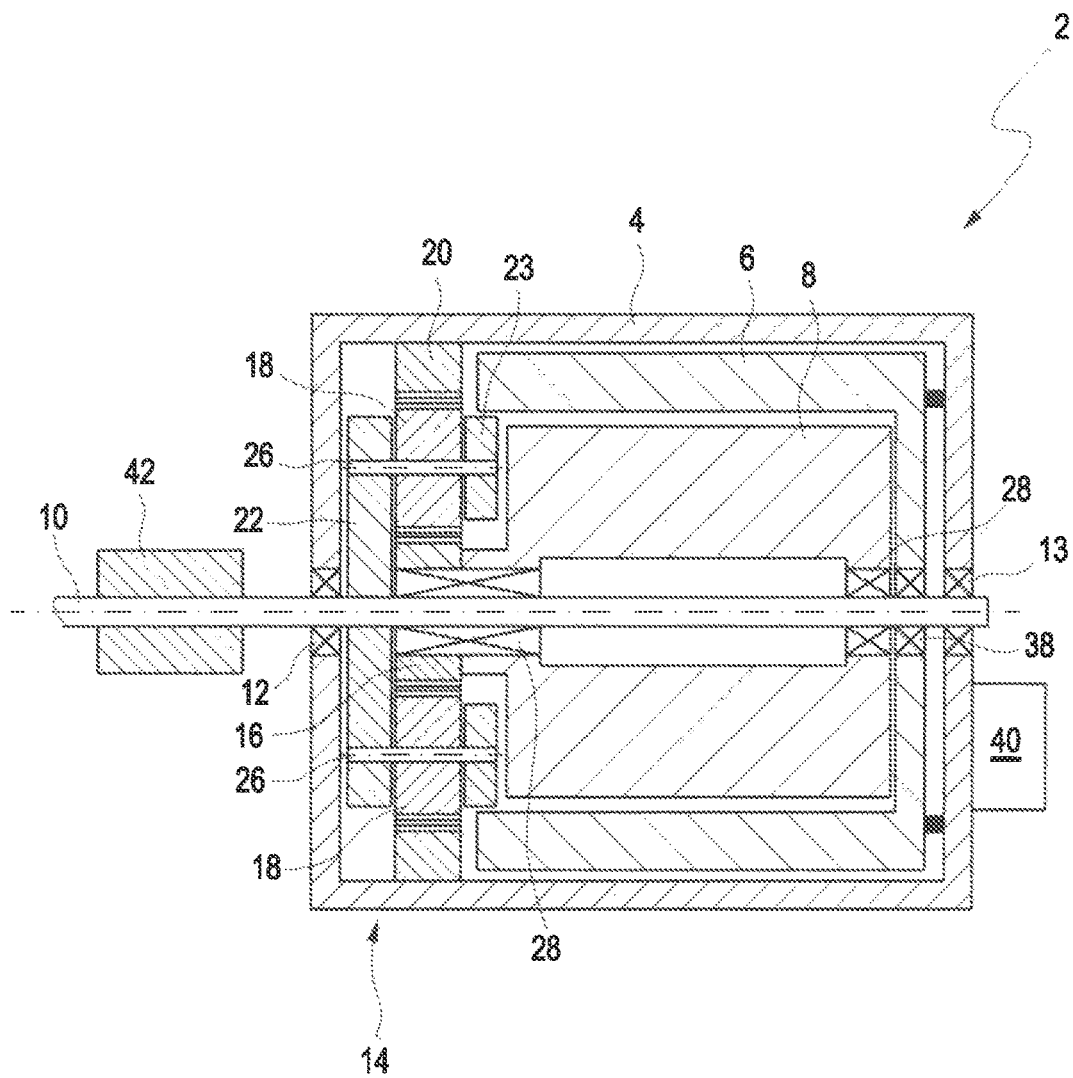

ELECTRIC MACHINE

CROSS-REFERENCES TO RELATED APPLICATIONS

This application claims the priority of German Patent Application, Serial No. 10 2014 007 550.8, filed May 22, 2014, pursuant to 35 U.S.C. 119(a)-(d), the disclosure of which is incorporated herein by reference in its entirety as if fully set forth herein.

BACKGROUND OF THE INVENTION

The present invention relates to an electric machine.

The following discussion of related art is provided to assist the reader in understanding the advantages of the invention, and is not to be construed as an admission that this related art is prior art to this invention.

An electric motor normally includes as components a stator and a rotor which can rotate in relation to the stator. One of these components has permanent magnets whereas the other one of the components has coils for conducting electric current. As a result, the coils generate magnetic fields which interact with magnetic fields of the permanent magnets to cause the rotor to rotate in relation to the stator.

It would be desirable and advantageous to provide an improved electric machine to obviate prior art shortcomings.

SUMMARY OF THE INVENTION

According to one aspect of the present invention, an electric machine includes a housing, a shaft rotatably supported in the housing, a stator received in the housing, a rotor received in the housing and interacting with the stator, and a planetary gear train accommodated in the housing and connecting the rotor and the shaft with one another.

In accordance with the present invention, the rotor is connected with the shaft indirectly via the planetary gear train. Thus, the rotor and the shaft can rotate at different rotation speeds.

According to another advantageous feature of the present invention, the planetary gear train can include a sun wheel which has external teeth and is connected with the rotor, a primary planet carrier which is connected to the shaft, a ring gear which has internal teeth and is mounted to the housing, and plural planet wheels, each planet wheel having external teeth and a planet wheel shaft which is rotatably secured to the primary planet carrier, with the external teeth of the planet wheels meshing with the external teeth of the sun wheel and engaging the internal teeth of the ring gear. In this way, the rotor and the sun wheel are connected in fixed rotative engagement. Also the primary planet carrier is connected with the shaft in fixed rotative engagement and thus these components can jointly rotate. The external teeth of the planet wheels mesh with both the external teeth of the sun wheel and the internal teeth of the ring gear. When operating the electric machine, a rotation of the rotor is transmitted via the sun wheel and the planet wheels to the primary planet carrier and thus to the output shaft.

The electric machine can be configured and used as electric motor, with the shaft forming in this case an output shaft. As an alternative or in addition, the electric machine may operate as generator, with the shaft forming a drive shaft.

The planetary gear train may find application for various types of electric machines, i.e. electric motors and/or generators, in which a rotor rotates in relation to a stator, with the rotor being arranged in coaxial relationship to the stator. Such an electric machine may be configured as, e.g., a commutator motor, three-phase commutator motor, brushless DC motor (BLDC), asynchronous motor, three-phase asynchronous motor, synchronous motor, or reluctance motor. These types of electric motors may also be operated as generators.

An electric machine according to the present invention thus includes a planetary gear train. At least one rotor bearing between the rotor and the shaft, formed as output shaft or drive shaft, is configured to assume a function of a differential bearing. In this case, the rotatable rotor of the electric machine is indirectly connected with the shaft of the electric machine via the planetary gear train. This measure enables operation of the electric machine at high rotation speeds. The planetary gear train has separate shafts, configured as planet wheel shafts, and bearings, configured as planet wheel bearings, via which the planet wheel shafts of the planet wheels are rotatably connected to the planet wheel carrier. Thus, the planetary gear train may be designated as an intermediate gear system and thus additional gear system of the electric machine.

The electric machine further includes as components the housing which may be configured as a housing pot, the stator which is secured to and/or on the housing, and the rotor which is rotatable in relation to both the stator and the housing. Further components of the electric machine are the shaft, operating as output shaft or drive shaft, and its bearings, operating as output shaft bearing or drive shaft bearing, via which the shaft is rotatably supported in the housing or in relation to the housing.

The planetary gear train as component of the electric machine is integrated in the housing. The rotor has a cylindrical internal wall and thus is configured hollow on the inside. A rotor support of the rotor includes the at least one bearing configured as rotor bearing. Both the rotor bearing and an output shaft bearing may be designed as radial sliding bearing or roller bearing so that the rotor is decoupled from the output shaft mechanically or rotationally.

A gear up and/or gear down ratio between the central sun wheel, which is connected in fixed rotative engagement with the shaft, and the planet wheels depends on a number of teeth of the internal toothing on the ring gear and on the number of teeth of the external toothing on the sun wheel and on each planet wheel and may, e.g., be 1:4. In this case, when the rotation frequency of the rotor or a rotor rotation speed is 10,000 revolutions per minute, the shaft or a drive shaft rotates and/or a drive shaft rotation speed and/or output shaft rotation speed is 2,500 revolutions per minute. A differential rotation speed between the rotor and the shaft at the at least one rotor bearing is thus 7,500 revolutions per minute. As a result of the characteristics of the planetary gear train, neither radial forces nor axial forces are exerted upon the at least one rotor bearing during operation of the electric machine, provided the internal teeth of the ring gear and the external teeth of the planet wheels are cylindrical, or straight, or arrow-shaped. Hence, the rotor bearing can be designed compact, lightweight and cost-effectively. Such radial forces and/or axial forces can be encountered only when the internal teeth and the external teeth are conical in shape and thus configured as oblique teeth.

The electric machine and the planetary gear train have a common shaft. The rotor is decoupled from the shaft via the differential bearing. All bearings of the electric motor, i.e. rotor bearings, planet wheel bearings and shaft bearings, may be made from metal and/or plastic and, optionally thus also from a composite, in a cost-effective way. The shaft, which traverses the housing, may be rotatably supported by the housing by using conventional engine bearings as shaft bearings. The primary planet carrier is connected in fixed rotative engagement with the shaft. The components of the planetary gear train, i.e. sun wheel, planet wheels, ring gear, may also be made from metal and/or plastic or composite. Integration of the planetary gear train and the bearings in the housing or housing pot enables production of electric machines of varying sizes.

The planetary gear train, also referred to as epicyclic gear train, may be designed of multi-stage configuration. In this case, the primary planet carrier may be mounted onto the shaft as part of a first stage and connected with the sun wheel as component of the second stage. The shaft is hereby connected with the primary planet carrier.

According to another configuration, external radial forces can be supported along an entire length of the electric machine, so that its bearings are only subjected to little stress. This is true for a first leading shaft bearing, arranged adjacent to the planetary gear train, and in particular for a second trailing shaft bearing, arranged adjacent to the rotor. The electric machine is of slight length and is lightweight and can be produced in a material-saving manner. The rotor bearings can be formed basically force-free, with each rotor bearing subjected only to the differential rotation speed between the rotor and the shaft. As a result, noise generation, wear, and power loss can be decreased. Noise damping can be realized by installing the stator, rotor, planetary rear train and shaft in the housing, configured as housing pot.

BRIEF DESCRIPTION OF THE DRAWING

Other features and advantages of the present invention will be more readily apparent upon reading the following description of a currently preferred exemplified embodiment of the invention with reference to the accompanying drawing, in which the sole FIG. 1 is a schematic sectional view of an embodiment of an electric machine according to the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment is sometimes illustrated by graphic symbols, phantom lines, diagrammatic representation and fragmentary view. In certain instances, details which are not necessary for an understanding of the present invention or which render other details difficult to perceive may have been omitted.

Turning now to FIG. 1, there is shown a schematic sectional view of an embodiment of an electric machine according to the present invention, generally designated by reference numeral 2. The electric machine includes a housing 4 in which a stator 6 and a rotor 8 are arranged in coaxial relation to a shaft 10, which in the non-limiting example of FIG. 1, forms an output shaft. The stator 6 is stationary and arranged in coaxial surrounding relation to the rotatable rotor 8. The shaft 10 is supported for rotation in relation to the housing 4 by two shaft bearings 12, 13, which are mounted on a front side and a rear side of the housing 4, respectively.

The electric machine 2 further includes a planetary gear train 14 which is arranged in the housing 4 and has a central sun wheel 16 which is firmly connected with the rotor 8 and may also be considered as a prolongation of the rotor 8. The planetary gear train 14 further includes several planet wheels 18, of which only two are shown in FIG. 1, a revolving ring gear 20, and a common primary planet carrier 22 for all planet wheels 18. The primary planet wheel 22 is arranged adjacent to a first shaft bearing 12 on a first end of the housing 4. A second shaft bearing 13 is arranged adjacent to the rotor 8 on a second end of the housing 4. The planet wheels 18 are configured as gears.

The sun wheel 16 has external teeth, and the ring gear 20, which embraces the sun wheel 16 and the planet wheels 18, has internal teeth. Each planet wheel 18 is rotatably connected with the primary planet carrier 22 via a planet wheel shaft 26. In the non-limiting example of FIG. 1, a first end of the planet wheel shaft 26 of each planet wheel 18 is secured to the primary planet carrier 22. An opposite second end of the planet wheel shaft 26 is secured to a secondary planet carrier 23. Thus, each one of the planet wheels 18 is rotatably arranged between the primary planet carrier 22 and the secondary planetary carrier 23 about the respective planet wheel shaft 26.

The primary planet carrier 22 is connected with the shaft 10 or mounted thereon. The ring gear 20 is connected with the housing 4 or secured thereon. The rotor 8 has here two rotor bearings 28 which surround the shaft 10 and via which the rotor 8 is rotationally decoupled from the shaft 10.

Although not shown in detail, the rotor 8 has several permanent magnets which are secured to and surround the rotor bearings 28. The stator 8 includes windings or coils, not shown in greater detail.

FIG. 1 further shows a stator bearing 38 via which the stator 6 is decoupled from the shaft 10, a controller 40 for controlling operation of the electric machine 2, and a wheel 42 which is arranged outside the housing 4 and secured to the shaft 10 and which is intended for attachment to a not shown structure to be driven by the electric machine 2, if used as electric motor.

When operating the electric machine 2, electric current is conducted through the coils of the stator 6 so that a magnetic field is generated which interacts with magnetic fields of the permanent magnets of the rotor 8. Thus, the rotor 8 and the connected sun wheel 16 are caused to rotate. As a result of the meshing external teeth of the sun wheel 16 and the planet wheels 18, the planet wheels 18 are also caused to rotate. As the external teeth of the planet wheels 18 also engage the internal teeth of the ring gear 20 that is secured to the housing 4, the primary planet carrier 22 and thus the connected shaft 10 are also caused to rotate. As a result, the shaft 10, which is not directly connected to the rotor 8 and thus is separate thereof, is indirectly driven and caused to rotate in the embodiment of the electric machine 2, shown here in FIG. 1, with the rotor 8 and the shaft 10 having different rotation speeds, as a result of the rotor bearings 28 and dependent on a gear down ratio of the planetary gear train 14.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
   a housing including a front side and a rear side;
   a shaft extending through a central axis of the housing and rotatably supported in the housing by a first shaft bearing mounted on the front side and a second shaft bearing mounted on the rear side of the housing;
   a stator received in the housing;
   a rotatable rotor received in the housing and interacting with the stator, wherein the stator is stationary and arranged in coaxial surrounding relation to the rotor; and
   a planetary gear train accommodated in the housing, directly connected with the rotor as a prolongation of the rotor and connecting the rotor and the shaft with one another,
   wherein the rotor is indirectly connected with the shaft via the planetary gear train,
   wherein the planetary gear train includes a sun wheel having external teeth and connected with the rotor, a primary planet carrier connected to the shaft, a ring gear having internal teeth and mounted to the housing, and plural planet wheels, each planet wheel having external teeth and a planet wheel shaft which is rotatably secured to the primary planet carrier, said external teeth of the planet wheels meshing with the external teeth of the sun wheel and engaging the internal teeth of the ring gear,
   wherein the primary planet carrier is arranged directly adjacent to the first shaft bearing and arranged entirely in the housing.

2. The electric machine of claim 1, constructed in the form of an electric motor, with the shaft defining an output shaft.

3. The electric machine of claim 1, constructed in the form of a generator, with the shaft defining a drive shaft.

* * * * *